Figure 1:
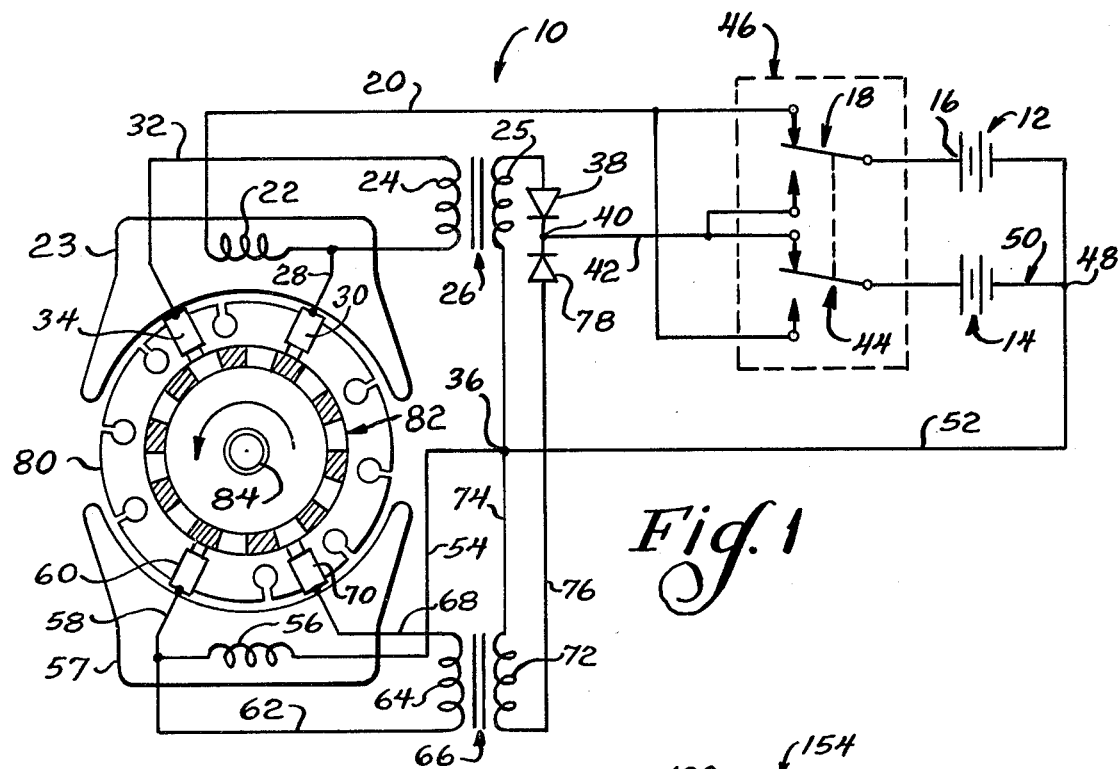

United States Patent [19]

Erickson et al.

[11] 4,237,410
[45] Dec. 2, 1980

[54] REGENERATIVE ELECTRIC MOTOR

[76] Inventors: Alfred C. Erickson, 329 Black Oak Dr., Michigan City, Ind. 46363; Clyde W. Erickson, Box 184, Sperry, Iowa 52650

[21] Appl. No.: 953,795

[22] Filed: Oct. 23, 1978

[51] Int. Cl.³ .......................... H02P 7/06; H02J 7/00
[52] U.S. Cl. ..................................... 320/14; 318/248; 318/376; 320/61
[58] Field of Search .................... 320/14, 61; 318/248, 318/376, 377

[56] References Cited

U.S. PATENT DOCUMENTS

| 1,291,233 | 1/1919 | Storer | 318/248 X |
| 3,611,091 | 10/1971 | Genovese | 320/14 X |
| 3,633,084 | 1/1972 | Rakes | 318/377 X |
| 3,996,504 | 12/1976 | Grzebielski | 318/376 X |

FOREIGN PATENT DOCUMENTS 96159  4/1972  France ..................................... 318/376

*Primary Examiner*—Robert J. Hickey
*Attorney, Agent, or Firm*—Sixbey, Friedman & Leedom

[57] ABSTRACT

An improved electric motor for use in battery powered vehicles wherein the motor is adapted for production of a secondary voltage to sequentially charge batteries used as the power source for powering the vehicle, which motors are adapted to be carried aboard the vehicle and to cyclically function as a means to drive the wheels of the vehicle and then to recharge the batteries used as the power source to drive the motors in operative relationship.

15 Claims, 2 Drawing Figures

REGENERATIVE ELECTRIC MOTOR

BACKGROUND OF THE INVENTION

The concept of an electrically powered vehicle itself is not new and it is common knowledge that such a vehicle was in use as early as 1888. Although the fundamental theory of electric vehicles has been well known since that time, and there has been no lack of effort over the years, it should be noted that there have been few new developments in the state of the art. Most prior and contemporary electrically operated vehicles employ generally the same basic concepts both in design and in application.

Present day electrically powered vehicles are capable of relatively high speeds of operation and are efficient and economical to operate although the manufacturing cost may be relatively high at this time.

When compared to the present day internal combustion engine used to power vehicles, the electric vehicle has an energy consumption rate substantially equivalent to about 200 miles per gallon. This is a significant departure in energy consumption and is very much worth the effort of development to explore the potential for such vehicles.

A serious limitation of electrically powered vehicles is in the limited ability to store energy for use by the vehicle. The present structures and assemblies are capable of a range of about 100 miles in contrast to the 300 to 500 mile range of operation of vehicles powered by internal combustion engines. It should be noted that the range limitations of electrically powered vehicles as noted here contemplated the use of a reasonable limitation on batteries as the power reservoir. A compromise must be developed between load and power source and convenience of use and economy of manufacture. Also, a large increase in the numbers of batteries carried would define a concomitant increase in the charge time for the batteries which would result in a further inconvenience for the user.

The above design limitations have generally resulted in a failure to provide a vehicle with a combination of features competitive with the internal combustion power source and there has been no realization of a design which would provide an acceptable compromise for wide acceptance of an electrically powered vehicle.

The most acceptable compromise would, of course, involve the provision of an assembly of elements for an electrically powered vehicle which would be competitive in cost and range of use when compared to a vehicle powered by an internal combustion engine.

It should be noted that many diverse attempts have been made to provide an electrically powered vehicle with a range of operation approaching the internal combustion engine powered vehicle but none have been successful within reasonable design and use limitations. These attempts have involved, in part, the use of wind driven generators for recharging the battery power source; the use of a solar-cell battery which, of course, is recharged during conditions of light; the use of generators driven by motor actuated flywheels; the use of regenerative braking devices wherein the motor is momentarily converted into a generator during deceleration of the vehicle thereby generating a charging current which may be applied to the batteries to recharge them during use. In addition, assemblies of the type noted herein have been provided with small internal combustion driven generators to re-charge the batteries while the vehicle is in use during low battery demand operation of the vehicle. These attempts are of an evolutionary character and have not, to date, contributed significantly to the extension of the range of use of the vehicle sufficiently to make its use attractive when compared to vehicles powered by internal combustion engines.

Most prior attempts in development of electrically powered vehicles for extension of the range of operation have involved the use of a single set of batteries as the power source. To this extent, it can readily be seen that it has been necessary to attempt to recharge the battery while at the same time the batteries are being discharged during operation of the vehicle. This technique requires that the generating device be capable of producing more power than the motor consumes during operating conditions of the vehicle.

DISCLOSURE

The present invention is directed to the provision of an improved electrically operated vehicle and more specifically to the electrical system employed for use with such a vehicle to extend the range and time during which the vehicle may effectively be operated.

The system disclosed and claimed herein is intended for use in electric vehicle wherein the electrical system associated therewith includes two sets (or more) of storage batteries for sequential use in operation of the vehicle.

The motor structure employed in the device set forth herein operates sequentially as a drive motor powered by the batteries associated with the vehicle and in the second instance the motor is employed as a means to provide electrical energy to cause the batteries to be recharged in use of the vehicle.

In operation of the vehicle, power is supplied to the motor by a first set of batteries to cause the motor to be rotated to drive the wheels or other propulsion means associated with the vehicle while the second set of batteries may be re-charged during use of the vehicle during the sequential mode of operation when the motor is functioning to serve as a means to cause a chemical change within the electrolyte of the battery to chemically store energy therein which may later be called upon for use in operation of the vehicle.

The cycle of operation will occur several times during any given revolution of the rotor of the motor thereby giving rise to substantially simultaneous application of driving power to the propulsion means and charging energy for the second set of batteries in operation of the vehicle.

The operation of the system set forth herein is such that the power supply/battery charge function is alternated between the two battery sets dependent upon the condition of the system and operation of the system.

The switch involves, of course, removal of one set of batteries as the power source for the propulsion motors and switching over to use of the second set for this purpose while at the same time restoring the first set from power source to charge function to restore the energy in the just used set of batteries and prepare it for the next use cycle.

This switching action occurs on a cyclical basis in use of the vehicle and is available by reason of the fact that one set of batteries is constantly being charged while the other is in use. This mode of operation significantly extends the range of use of the vehicle both in miles of use and duration of use.

The extent of effective recharge of the charging battery set is a function of the amount of battery power consumed during a discharge or powering cycle and the amount of time recharge operations are permitted depending upon the conditions of use of the vehicle.

Use of the vehicle at reasonable speeds of operation on a level or substantially level terrain without the concomitant large power demands in use such as would be imposed by acceleration or load lifting when climbing, or the like, will permit both battery sets to be maintained at a relatively high charge level during use for a significant period of time in operation of the vehicle.

We have found, based upon present lead acid battery technology, that utilization of the concepts set forth herein have increased effective battery use by a factor of three with the motor operating at full speed and an increase by a factor of five with lower demand upon the batteries in use. It can readily be seen that use of the system set forth herein will effectively increase the range of a vehicle employing this system to about 300 to 500 miles, depending upon the nature of use of the vehicle, thereby making the vehicle, as such, competitive in range of use with vehicles powered by internal combustion engines.

It is, therefore, a primary object of the present invention to provide an improved electrical system for use with a vehicle to extend the use of a vehicle in duration and range when so employed.

Other objects and advantages of the invention set forth herein reside in the provision of an improved motor device which is capable, in use, of powering a vehicle while simultaneously re-charging the power supply associated with the system; which is economical in use; which is easy to use; which is durable in use and which is economical to manufacture and use.

The novel features which are believed to be characteristic of the present invention are set forth with particularity in the appended claims.

Figure 2:
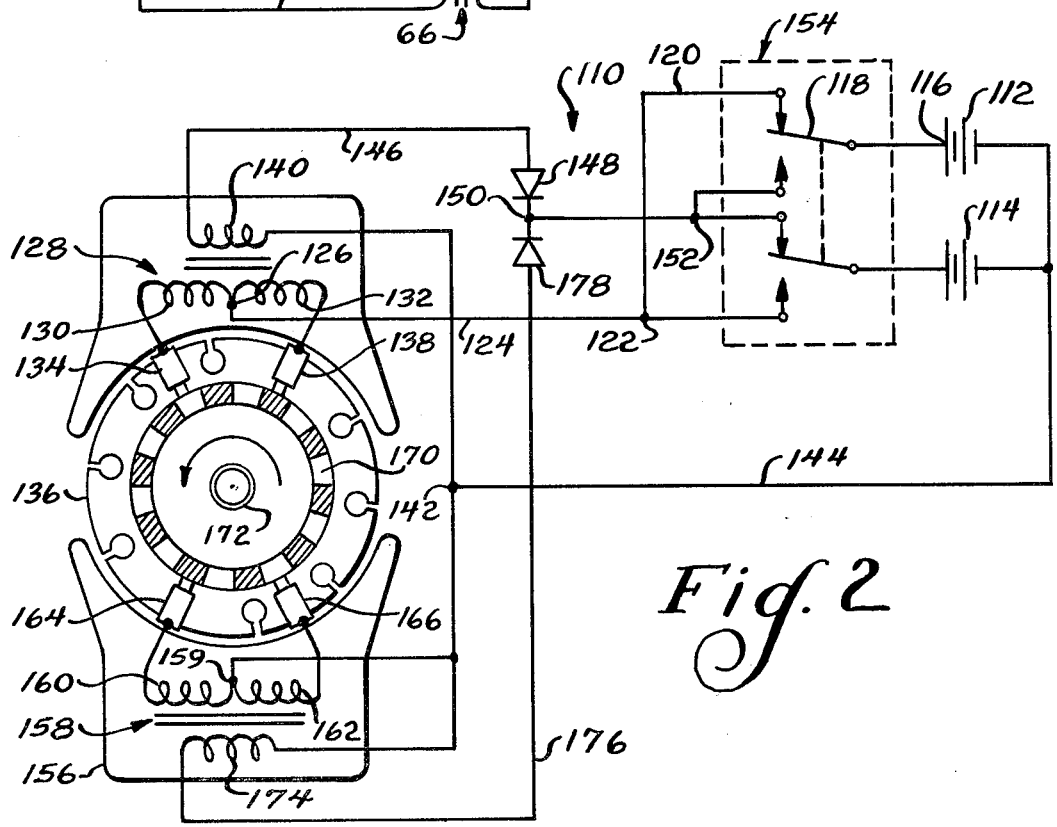

The invention itself, however, together with further objects and advantages thereof will best be understood by reference to the following description taken in connection with the accompanying drawings, in which:

FIG. 1 is a schematic representation of one form of system of the inventive concept set forth herein showing the motor combination and the battery sets employed with the system; and FIG. 2 is a schematic representation of another form of the inventive concept.

Referring more specifically now to the drawings one form of the inventive concept set forth herein is shown generally at 10 in FIG. 1 of the drawings. It should be noted that the electrical system schematically set forth in FIGS. 1 and 2 of the drawings herein use conventional electrical symbols. While directional flow of current is recognized as involving an electron flow and extending from an area of higher potential to one of lower potential the flow and description of the inventive embodiments represented here shall be described from + to − in conventional description of battery powered circuits.

The motor concepts disclosed herein involve a departure from conventional forms of such devices. As is well known, operation of an electrically powered motor (either A.C. or battery powered) an electrical phenomena occurs within the motor which may commonly be identified as the development of a counter-electromotive force (cemf). This force will occur at the instant of cessation of power input to the winding of the motor. The electromagnetic flux generated by the creation of a field about the winding will again arise upon collapse of the field by termination of application of power to the winding. Collapse of the field gives rise to an electric potential of opposite polarity within the winding or any entity adjacent thereto which may be capable of conducting electrical or magnetic energy. This phenomena has not been effectively employed in prior art devices in a manner which is adapted to make efficient use of this energy. This cemf, of course, occurs at the end of each power cycle applied to the winding.

The motor design set forth herein is adapted to utilize this cemf so as to provide a secondary energy source within the motor itself for the purpose of recharging storage batteries associated with the system and employed as an energy source for powering the vehicle with which the system is employed.

As is well known, a typical series wound motor configuration will include a field winding, an armature/commutator assembly, and a brush assembly. The armature usually is provided with several windings wrapped around the several pole pieces comprising the armature assembly. Each armature winding is connected to a commutator segment in the motor in such a manner that, upon contacting a particular brush in the brush assembly of the device the armature is magnetically attracted to the field winding and a rotary motion is imparted through this energy field which results in rotation of the commutator. This magnetic attraction ceases at such time as the commutator segment associated with the phenomena is caused to rotate past the brush assembly and electric power to the associated armature winding and the field winding is automatically switched off.

The following commutator segment would respond in a similar manner as described above thereby maintaining rotation of the commutator assembly and serving as a means for conversion of electrical energy to mechanical energy.

This on and off switching action occurs many times during a single rotation of the assembly and continues so long as rotation is permitted or for so long as power continues to be applied to the windings of the device.

It is well known that a conventional armature/commutator assembly includes a single commutator segment per armature pole piece. The new concept set forth herein includes two (2) commutator segments per armature pole piece. One segment of the pair of electrically connected to its respective armature winding while the other of the segments is electrically dead or is not connected to any of the armature windings. Further, in a conventional motor configuration the brush assembly comprises a pair of diametrically opposed brushes per armature/field arrangement. The device set forth herein comprises two pairs of brushes in essentially the same relationship. However, whenever one pair of opposing brushes is in contact with live commutator segments the other opposing pair is in contact with dead commutator segments. Rotation of the armature/commutator assembly past the brushes causes the brushes to alternately contact live and dead segments within the commutator and thus enhance the on and off switching action characteristic of operation of the device. This enhancement of the switching action causes a cemf of greater amplitude to be generated within the motor than would normally be generated in use of a conventional motor.

The field winding of the present device could be defined in several ways. For example, the field could be wired in series with an external transformer (as in the device of FIG. 1 of the drawings). In this instance the secondary winding of the external transformer would serve as a means of harnessing the cemf to make it available for use in re-charging the inactive set of batteries.

In another configuration (as shown in FIG. 2 of the drawings) the motor would include three separate winding segments per field. Two of the windings would have a common terminal with the other ends thereof being individually terminated at each of the brushes comprising the brush pair associated with that field winding. The third winding of this field would serve basically the same function as the secondary winding of the external transformer configuration (FIG. 1) and would be adapted to harness the cemf as it is induced within either of the two field windings.

In either configuration action of the brush assembly, in conjunction with the live and dead commutator segments, would enhance cemf induced within the device which would thereupon be reflected as a secondary voltage within the secondary winding. When properly connected to the vehicle electrical system this voltage would be utilized to recharge the batteries associated with the system. When one set of batteries is being used to power the motor the secondary voltage induced in the motor is used to recharge the second set of batteries thus effectively harnessing and storing cemf that is normally lost within a conventional device.

Although the cemf is not of sufficient power to boost motor power or to adequately reduce power requirements, it is sufficient to recharge a second set of batteries so long as they are not powering the motor. It should be noted that the energy transfer is not 100% efficient since some of the energy caused by the collapse of the field is lost as heat in the device.

The extent to which the second battery set is recharged is a function of the load imposed upon the first set which in turn determines when the second set must be called upon to power the motor. In alternating back and forth between battery sets, both sets would obtain recharge voltage from the motor secondary winding and would thus be maintained at a higher potential. This reduced rate of discharge would enable the vehicle to range further than a conventional electric vehicle by a factor of 3 to 5, contingent upon demands placed upon the vehicle and the systems associated therewith.

As shown in the schematic representations of the device in the form shown in FIG. 1 of the drawings, two battery sources 12 and 14 are employed. The positive terminal 16 of the battery 12 is connected through the switch element 18, through the lead 20 to one terminal of the winding 22. The other terminal of the winding 22 is connected to one terminal of the primary winding 24 of the transformer 26 and through the lead 28 to one of the brushes 30 associated with the device.

The other terminal of the winding 24 of the transformer 26 is connected through lead 32 to the brush 34 of the device.

The secondary winding 25 of the transformer 26 is connected at one end to a common terminal 36 and at the other end to one terminal of the diode 38. The other terminal of the diode 38 is connected through the common point 40 and lead 42 to the switch terminal associated with switch 18 and with switch 44.

Switches 18 and 44 comprise a unit functioning assembly switch 46 in the nature of a double pole double throw switch assembly wherein the switches 18 and 44 are switched in unison to connect or disconnect associated battery power supplies 12 and 14 from or to the field windings of the device as desired in use of the device.

It can readily be seen from the schematic representation of FIG. 1 of the drawings that the battery sets 12 and 14 are in parallel in the circuit and either may be used in powering of the device 10, as described herein.

The negative terminal of battery 12 is connected to the common point 48 which, in turn, is connected through the lead 50 to the negative terminal of the battery 14. The point 48 is connected through lead 52 to the common point 36 and through lead 54 to one terminal of the winding 56 of the device 10. The other terminal of the winding 56 is connected through lead 58 to one of the brushes 60 associated with the device and through lead 62 to one end of the primary winding 64 of the second transformer 66. The other end of the primary winding 64 is connected through lead 68 to brush 70.

One end of the secondary winding 72 of the transformer 66 is connected through lead 74 to the common point 36, as shown, while the other end of the secondary winding 72 is connected through the lead 76 to one terminal of the diode 78, the other terminal of the diode 78 being connected to the common point 40 and through lead 42 to the switch elements 18 and 44 of the switch assembly 46.

The windings 22 and 56 of the device schematically illustrated in FIG. 1 of the drawings are commonly identified as field windings of the apparatus and are defined within the bodies 23 and 57, respectively, of the device.

The brushes, noted above, are associated with the armature 80 of the device 10. A commutator 82 is associated with the device 10 and adapted to be rotated in the armature/commutator assembly. The commutator 82 has a plurality of so-called live segments represented by the un-shaded areas thereof adapted to move into and out of registration with the brushes associated with the device 10.

An output shaft 84 is associated with the device 10 and defines the means for application of mechanical energy caused by rotation of the armature/commutator assembly of any desired outside application thereof.

Operation of the device may best be understood by reference to the drawings of FIG. 1 wherein the battery 12 is illustrated as being electrically connected to the winding 22. It can readily be seen that a D.C. voltage is connected from the battery 12 through the switch element 18 to the motor winding field involving the field 23 and winding 22.

If we assume that brush 34 is in contact with a live commutator segment (as illustrated) a voltage will be impressed through the primary winding 24 of the transformer 26 through the brush 34, the commutator 82 to brush 70 (the opposed active segment of the commutator), through the primary winding 64 of the transformer 66, through the field winding 56 to the common point 48 which, of course, is electrically connected to the negative terminals of the battery sets 12 and 14, as shown, thereby completing the electrical circuit through the device 10.

As the device is caused to rotate the brushes 34 and 70 will come into contact with dead commutator segments and the electrical circuit noted above will be effectively switched open and terminated. It can readily be seen that the field will collapse about the windings thereby inducing a voltage in the secondary windings 25 and 72 of the transformers 26 and 66, respectively. One end of each of the secondary windings of the transformers, as noted above, is connected through the common point 36 and lead 52 to the negative terminals of the battery sets 12 and 14. The other ends of the secondary windings are connected through diodes 38 and 78 to the switch assembly 46 of the system. In the position shown it can readily be seen that when the field collapse occurs battery 14 will be charged by the potential generated in the secondary windings of the system through the switch means 46 which, as shown, connects the secondary windings to battery 14 through the diode assembly.

When the brushes 34 and 70 are brought into contact with a dead commutator segment of the commutator 82 the brushes 30 and 60 with come into contact with live commutator segments thereby giving rise to continuity in operation of the motor by continuing imposition of torque which is transferred to the output shaft 84 of the device 10. Under this condition of operation the impedance of the transformers 26 and 66 will act as a high resistance and the current will flow only through the field windings 22 and 56 of the device and back to the common point 48 of the system thereby switching the transformers out of the circuit.

The cycle described above will, of course, be repeated each time that the brushes 34 and 70 come into engagement with live commutator segments and a recharge potential will be imposed upon the battery set being charged in operation of the device.

It can readily be seen that one battery set is being re-charged at all times during operation of the device and while the re-charge usually is not as great as the discharge upon demand it will extend the useful life of the system as described.

Operation of the switch assembly 46 to a position opposite to that shown will not affect operation of the device since it will simply act to transfer the system to utilization of battery 14 as the power source instead of battery 12 as described in detail above. In all other respects operation will remain the same with battery 12 being recharged during this cycle.

In this manner the charged level of both battery sets will be maintained at a higher level than if they were only operated in the discharge mode depending upon demand in use of the vehicle associated with the device 10.

The device 110 of FIG. 2 is, in general, similar to the device 10 of FIG. 1 except that transformer coupling of the induced cemf is accomplished within the motor itself instead of through externally associated transformers as in the device 10 of FIG. 1.

The device 110 includes battery sets 112 and 114 connected in parallel in the system. The positive terminal 116 of the battery set 112 is connected through the switch element 118 and through the lead 120 to a common point 122. The common point 122 of the system is electrically connected through the lead 124 to a center tap 126 of the field winding 128 dividing the field winding 128 into segments 130 and 132, respectively. The other terminal of segment 130 is electrically connected to the brush 134 associated with the armature 136. The other terminal of the winding segment 132 is electrically connected to the brush 138, as shown. The winding segments 130 and 132 are wound in the same direction to maintain polarity in operation of the device 110.

The winding 140 of field 128 functions as the secondary field winding and, of course, functions in much the same manner as the secondary windings of the transformers of the form of inventive concept described in connection with a discussion of the apparatus of FIG. 1 of the drawings.

One end of the secondary winding 140 is electrically connected to a common point 142 and then through the lead 144 to the negative terminals of the battery sets 112 and 114, respectively.

The other end of the secondary field winding 140 is connected through the lead 146 to one terminal of the diode 148, the other terminal of the the diode 148 being connected to the common point 150 and through an associated lead to a common point 152 of the switch assembly 154.

The switch assembly 154 is substantially the same as described in connection with the discussion of the device of FIG. 1 and operates in the same manner.

Field 156 is provided with a field winding 158 wound in the same manner as the winding 128 and is connected at the center tap 159 to a common point 142 of the system. The winding 158 is thereby divided into segments 160 and 162. The other end of winding segment 160 is connected to the brush 164 while the other end of winding segment 162 is connected to the brush 166. The commutator 170 and output shaft 172 function in the same manner as noted in description of the device of FIG. 1.

A secondary field winding 174 is provided with field 156 and is connected at one end to the common point 142 and at the other end, through lead 176 to one terminal of the diode 178 with the other terminal of the diode 178 being connected to the common point 150 and therethrough to the common point 152 of switch 154.

It will be seen, therefore, that each field winding comprises three functionally distinct windings, as described and the device operates in substantially the same manner as the device of FIG. 1.

In operation of the device in the mode schematically illustrated in FIG. 2 of the drawings, the positive terminal of the battery set 112 is electrically connected to the common end of the windings 130 and 132. If we assume that brush 134 is in contact with a live commutator segment of the commutator 170 electric power will be directed through winding segment 130 of field winding 128, through the brush 134 to brush 166, through the winding segment 162 and back to the negative terminals of the battery sets 112 and 114 completing the circuit. As the device is caused to rotate the brushes 134 and 166 will come in contact with dead commutator segments thereby causing the above described circuit to be opened and current flow terminated therein. This action, as described in detail above, causes the electrical field about the winding segments to collapse thereby inducing a voltage in the secondary windings 140 and 174.

As shown, one end of the windings 140 and 174, respectively, are connected to the negative terminals of the battery sets while the other ends thereof are connected through the diodes to the positive terminals of the batteries. In the mode of operation schematically illustrated in FIG. 2 of the drawings, the battery set 114 will be charged when the events noted above occur.

In continued operation of the device 110 the brushes 134 and 166 will sequentially come into contact with dead commutator segments and brushes 138 and 164 will simultaneously come into contact with live commutator elements. This action energizes the opposite winding segments of the field windings to cause continued operation of the motor.

The operation of this form of the inventive concept is different from that shown in connection with the device of FIG. 1 in that when brushes 138 and 164 come into contact with dead commutator segments, in continued operation of the motor, the field in said windings will collapse thereby causing induction of a voltage in the secondary windings 140 and 174 giving rise to an additional charge current for the inactive battery set. Accordingly, a charge current is available in collapse of the field through either winding segment, as distinguished from the device of FIG. 1.

The switch means 154 may be employed to switch the power source from battery set 112 to battery set 114 in the same manner as noted in description of the device of FIG. 1.

While we have shown and described a specific embodiment of the present invention it will, of course, be understood that other modifications and alternative constructions may be used without departing from the true spirit and scope of this invention. It is intended by the appended claims to cover all such modifications and alternative constructions as fall within their true spirit and scope.

We claim:

1. An electric motor for converting electrical energy from a primary energy source into mechanical energy while simultaneously utilizing counter-electromotive force developed during motor operation to provide a secondary source of energy, said electric motor comprising:
    (a) a stator structure including a stator field generating means for receiving current from the primary energy source and for generating a first electromagnetic field in response to the flow of current so received;
    (b) a brush means connected to said stator field generating means for receiving current therefrom;
    (c) an armature structure mounted for rotation relative to said stator structure, said armature structure including an armature field generating means energizible by a current flow to generate a second electromagnetic field which interacts with said first electromagnetic field to create a torque for rotating said armature structure relative to said stator structure, said armature structure further including a commutator means connected to said armature field generating means for electrically contacting said brush means to conduct a flow of current periodically from the primary energy source through said stator field generating means and said brush means to said armature field generating means such that said first and second electromagnetic fields are respectively generated by said stator field generating means and said armature field generating means to create said torque for rotating said armature structure relative to said stator structure, and;
    (d) transformer means connected to said brush means for generating a counter-electromotive force in response to the periodic flow of current through said brush means and for converting the counter-electromotive force so generated to an output voltage.

2. An electric motor as set forth in claim 1, wherein said stator structure includes first and second stator sections and said stator field generating means includes a first field winding disposed on said first stator section and a second field winding disposed on said second stator section.

3. An electric motor as set forth in claim 1, wherein said armature field generating means includes a plurality of armature windings and said commutator means is divided into a corresponding plurality of paired, electrically-conductive segments respectively connected to said plurality of armature windings.

4. An electric motor for converting electrical energy from a primary energy source into mechanical energy while simultaneously utilizing the counter-electromotive force developed during motor operation to provide a secondary source of energy, said motor comprising:
    (a) a stator structure including a stator field generating means for receiving current from the primary energy source and for generating a first electromagnetic field in response to the flow of current so received;
    (b) a brush means connected to said stator field generating means for receiving current therefrom;
    (c) an armature structure mounted for rotation relative to said stator structure, said armature structure including an armature field generating means energizible by a current flow to generate a second electromagnetic field which interacts with said first electromagnetic field to create a torque for rotating said armature structure relative to said stator structure, said armature structure further including a commutator means for electrically contacting said brush means to conduct a flow of current periodically from the primary energy source through said stator field generating means and said brush means to said armature field generating means such that said first and second electromagnetic fields are respectively generated by said stator field generating means and said armature field generating means to create said torque for rotating said armature structure relative to said stator structure, said commutator means having a plurality of electrically conductive segments positioned to provide said electrical contact with said brush means and connected to said armature field generating means to conduct said periodic flow of current thereto, said commutator means also having a plurality of electrically non-conductive segments respectively interposed between adjacent electrically conductive segments, and;
    (d) transformer means connected to said brush means for generating a counter-electromotive force in response to the periodic flow of current through said brush means and for converting the counter-electromotive force so generated to an output voltage.

5. An electric motor as set forth in claim 4, wherein said brush means includes two pairs of brush elements positioned such that one pair of said brush elements is in contact with said electrically conductive segments of said commutator means whenever the other pair of said brush lements is in contact with said electrically non-conductive segments of said commutator means.

6. An electric motor as set forth in claim 4, wherein said stator structure includes a first stator section and a second stator section and said stator field generating means includes a first field winding disposed on said first stator section and a second field winding disposed on said second stator section.

7. An electric motor as set forth in claim 6, wherein a first brush element in each said pair of brush element is serially connected to said first field winding and a second brush element in each said pair of brush elements is serially connected to said second field winding 8. An electric motor as set forth in claim 7, wherein said transformer means includes first and second transformer units and said first field winding provides the primary winding for said first transformer unit while the second field winding provides the primary winding for said second transformer unit.

9. An electric motor as set forth in claim 8, wherein said first primary winding and said second primary winding are both center-tapped and said first brush elements are respectively connected in series to the opposite ends of said first field winding while said second brush elements are respectively connected in series to the opposite ends of said second field winding.

10. An electric motor as set forth in claim 8, wherein said pluralities of electrically conducting and non-conducting segments on said commutator means are radially arranged with respect to the axis of rotation of said armature structure to form a commutator ring of alternating conductive and non-conductive segments, and said first and second brush elements in each said pair of brush elements are positioned in diametrically opposed relationship about the periphery of said commutator ring.

11. An electric motor system for converting electrical energy from a first electrical energy source into mechanical energy while simultaneously utilizing counter-electromotive force developed during motor operation to charge a second electrical energy source, said electric motor system comprising
    (a) a first source of electrical energy;
    (b) a second source of electrical energy;
    (c) a stator structure including a stator field generating means for receiving current from said first source of electrical energy and for generating a first electromagnetic field in response to the flow of current so received;
    (d) a brush means connected to said stator field generating means for receiving current therefrom;
    (e) an armature structure mounted for rotation relative to said stator structure, said armature structure including an armature field generating means energizible by a current flow to generate a second electromagnetic field which interacts with said first electromagnetic field to create a torque for rotating said armature structure relative to said stator structure, said armature structure further including a commutator means connected to said armature field generating means for electrically contacting said brush means to conduct a flow of current periodically from said first source of electrical energy through said stator field generating means and said brush means to said armature field generating means such that said first and second electromagnetic fields are respectively generated by said stator field generating means and said armature field generating means to create said torque for rotating said armature structure relative to said stator structure;
    (f) transformer means connected to said brush means for generating a counter-electromotive force in response to the periodic flow of current through said brush means and for converting the counter-electromotive force so generated to an output voltage, and;
    (g) a circuit means for conducting current from one of said first and second sources of electrical energy to said stator field generating means to cause said armature structure to rotate relative to said stator structure while simultaneously supplying said output voltage from said transformer means to the other of said first and second sources of electrical energy to effect a charging relationship between said transformer means and the other of said first and second sources of electrical energy.

12. An electric motor system as set forth in claim 11, wherein said circuit means includes a switching means for alternately conducting current from one of said first and second electrical source means while alternately supplying the other of said first and second sources of electrical energy with said output voltage.

13. An electric motor system as set forth in claim 12, wherein said first and second sources of electrical energy are direct current sources.

14. An electric motor system as set forth in claim 13, wherein said first and second sources of electrical energy are batteries.

15. An electric motor as set forth in claim 14, wherein said circuit means includes diode means connected between said transformer means and the alternately supplied other source of electrical energy.

* * * * *